United States Patent [19]

Nalley et al.

[11] 4,418,368

[45] Nov. 29, 1983

[54] METHOD AND APPARATUS FOR POSITIONING A TRANSDUCER USING EMBEDDED SERVO TRACK ENCODING

[75] Inventors: Robert E. Nalley, San Jose; Leonard R. Shenfield, Saratoga, both of Calif.

[73] Assignee: Disctron, Inc., Milpitas, Calif.

[21] Appl. No.: 253,086

[22] Filed: Mar. 31, 1981

[51] Int. Cl.³ .................... G11B 21/08

[52] U.S. Cl. .................... 360/78

[58] Field of Search .................... 360/77, 78, 75–76

[56] References Cited

U.S. PATENT DOCUMENTS

| | | | |
|---|---|---|---|
| 3,691,543 | 9/1972 | Mueller | 360/77 |
| 3,821,804 | 6/1974 | Stevenson et al. | 360/77 |
| 4,027,338 | 5/1977 | Kril | 360/77 |
| 4,032,984 | 6/1977 | Kaser et al. | 360/77 |
| 4,149,199 | 4/1979 | Chick et al. | 360/77 |
| 4,149,200 | 4/1979 | Card | 360/77 |
| 4,149,201 | 4/1979 | Card | 360/77 |

OTHER PUBLICATIONS

Lewkowicz, "Tri-Bit Servo Detection", 8/76, IBM-TDB, pp.810-813.

*Primary Examiner*—Alfred H. Eddleman
*Assistant Examiner*—Kin Wong
*Attorney, Agent, or Firm*—Spensley, Horn, Jubas & Lubitz

[57] ABSTRACT

A system and method for accurately positioning a transducer means radially in alignment with a selected data track on a magnetic disc and maintaining it in radially alignment is described. Sectored servo tracks radially interspersed with data tracks on a magnetic disc, are uniquely encoded within groups, the code comprising the location of recorded servo signals at either a first or second position within a plurality of data frames located on the servo tracks. The recorded servo signals are detected by a transducer and compared with a D.C. voltage in a comparator in order to produce a series of clock pulses for a shift register. A predetermined sequence of pulses corresponding to possible locations for recorded servo signals within the data frame in a sector is the data input to the shift register. The output of the shift register is a binary number corresponding to the servo track or the data track with which the transducer is radially aligned. This information is processed to identify the radial location of the transducer and to provide, if required, a signal to move the transducer radially. The use of a unique encoding scheme wherein the encoding on the successively positioned servo tracks for any data frame is allowed to change only once every N number of tracks, where N is the number of data frames per track, enhances the abiity of a second position detecting means to maintain the transducer in radial alignment with the selected data track. This is accomplished by circuitry which compares the peaks of the signals corresponding to the first and second locations within a selected data frame, the selection of the data frame depending upon the selected data track, and applying the signal to move the transducer radially, if necessary.

15 Claims, 13 Drawing Figures

SERVO TRACK ENCODING PATTERN

| TRACK NO | DATA FRAME 0 | 1 | 2 | 3 |
|---|---|---|---|---|
| ST 7.5' | A | A | A | A |
| ST 0.5 | B | A | A | A |
| ST 1.5 | B | B | A | A |
| ST 2.5 | B | B | B | A |
| ST 3.5 | B | B | B | B |
| ST 4.5 | A | B | B | B |
| ST 5.5 | A | A | B | B |
| ST 6.5 | A | A | A | B |
| ST 7.5 | A | A | A | A |

FIG. 10.

DYNAMIC COMPARATOR OUTPUT TABLE

| TRACK NO. | DATA FRAME S0 0 H1 (G1) | H2 (G2) | S1 1 H1 (G1) | H2 (G2) | S2 2 H1 (G1) | H2 (G2) | S3 3 H1 (G1) | H2 (G2) |
|---|---|---|---|---|---|---|---|---|
| ST 7.5 | C | | C | | C | | C | |
| DT 0.0 | C | C | C | | C | | C | |
| ST 0.5 | | C | C | | C | | C | |
| DT 1.0 | | C | C | C | C | | C | |
| ST 1.5 | | C | | C | C | | C | |
| DT 2.0 | | C | | C | C | C | C | |
| ST 2.5 | | C | | C | | C | C | |
| DT 3.0 | | C | | C | | C | C | C |
| ST 3.5 | | C | | C | | C | | C |
| DT 4.0 | C | C | | C | | C | | C |
| ST 4.5 | C | | | C | | C | | C |
| DT 5.0 | C | | C | C | | C | | C |
| ST 5.5 | C | | C | | | C | | C |
| DT 6.0 | C | | C | | C | C | | C |
| ST 6.5 | C | | C | | C | | | C |
| DT 7.0 | C | | C | | C | | C | C |
| ST 7.5 | C | | C | | C | | C | |

FIG. 11.

OUTPUT OF SHIFT REGISTER

| TRACK NO. | BIT E | D | C | B | A |
|---|---|---|---|---|---|
| ST 7.5 | | 1 | 1 | 1 | 1 |
| DT 0.0 | 1 | 0 | 1 | 1 | 1 |
| ST 0.5 | | 0 | 1 | 1 | 1 |
| DT 1.0 | 0 | 1 | 0 | 1 | 1 |
| ST 1.5 | | 0 | 0 | 1 | 1 |
| DT 2.0 | 0 | 0 | 1 | 0 | 1 |
| ST 2.5 | | 0 | 0 | 0 | 1 |
| DT 3.0 | 0 | 0 | 0 | 1 | 0 |
| ST 3.5 | | 0 | 0 | 0 | 0 |
| DT 4.0 | 1 | 0 | 0 | 0 | 0 |
| ST 4.5 | | 1 | 0 | 0 | 0 |
| DT 5.0 | 1 | 1 | 0 | 0 | 0 |
| ST 5.5 | | 1 | 1 | 0 | 0 |
| DT 6.0 | 1 | 1 | 1 | 0 | 0 |
| ST 6.5 | | 1 | 1 | 1 | 0 |
| DT 7.0 | 1 | 1 | 1 | 1 | 0 |
| ST 7.5 | | 1 | 1 | 1 | 1 |

NO ENTRIES READ AS TRAILING ZEROS

METHOD AND APPARATUS FOR POSITIONING A TRANSDUCER USING EMBEDDED SERVO TRACK ENCODING

BACKGROUND OF THE INVENTION

A. Field of the Invention

The present invention relates to an improved system and technique for radially positioning a transducer relative to a rotating disc and for maintaining the transducer in the desired radial position during the rotation of the disc.

B. Prior Art

In magnetic recording and reproducing systems, rotatable magnetic discs having a number of concentric data tracks located on them are often used. While the disc is rotating, it is essential that the magnetic transducer used to either record the data on the disc or to reproduce it from the disc remain in precise alignment with the proper data track on the disc.

A primary requirement is that the servo data take up a minimum of the disc recording surface, since that area will be unavailable for the storage of other information. Among other techniques, it has been known to intersperse servo tracks with the other information recorded on the disc. This other information is recorded in tracks radially located between the radial locations of the servo data tracks. A technique that has previously been used, and which is used with the present invention, is to provide the encoded servo data on such tracks in narrow radial sectors located on the disc surface. The remainder of the disc surface is then available for the storage of other information on data tracks. The interspersed or "embedded" servo data is encoded on the magnetic disc so that any particular servo or data track can be uniquely identified from the signals produced by a magnetic transducer sensing the servo data.

The recorded servo data must really perform two functions. It must assist the transducer positioning mechanism in accessing a selected data track and it must provide a means for enabling the transducer to follow the selected track with as little deviation as possible from the track during the rotation of the disc.

In the system described in U.S. Pat. Nos. 4,027,338 and 4,032,984, a transducer that is radially positioned over a selected track on a magnetic disc and maintained in that radial position through the use of servo data embedded within radial sectors on tracks, as mentioned above, is described. In that system, and in other similar systems, track identification information necessary for positioning the transducer over the correct track is provided by a plurality of adjacent cells in which a signal is recorded in either one of two positions. These signals actually represent reversals of magnetic flux on the disc when typical magnetic gap detectors are used. The presence of a reversal of magnetic flux or a magnetic transition at one location within the cell is taken to represent a binary digit zero while the occurence of the reversal or transition at the second location within the cell indicates the binary digit one. The preferred code in that system is the Gray code so that $2^N$ tracks can be uniquely encoded where N is the number of cells provided for the track identification function in each servo track. The detection of this information provides coarse servo data that is used to position the transducer in approximate registration with a selected target track.

Additional information encoded on the servo track serves to enable the transducer to follow the proper track during the rotation of the disc. This fine positioning servo data comprises a magnetic transition located at either one of two positions, the positions alternating with adjacent tracks. It will be appreciated that the system described in these patents and other similar systems that have been used use separate servo data for the track accessing and track following functions.

SUMMARY OF THE INVENTION

In the present invention, all the servo information necessary for both the track accessing and track following functions is combined and encoded in one sequence on the servo tracks of a magnetic disc. Importantly, the decoding scheme of the present invention allows for track identification to the nearest servo or data track, i.e., with a resolution of one-half of a track since the servo and data tracks are interspersed, the data tracks being located halfway between adjacent servo tracks. Furthermore the novel encoding sequence used in the present invention enhances the stability of the transducer positioning after a preselected track has been accessed. The enhanced resolution and stability are achieved, in practical systems, using a minimum of disc space.

In order to achieve the objects of fractional track detection, high stability and the use of a minimum amount of disc space in order to provide servo information to enable a transducer positioning mechanism to access a selected track and to accurately follow that track while the disc is rotating, the present invention provides, in its preferred embodiment, sectored servo tracks interspersed with the data tracks on the magnetic disc. Each narrow radial sector has a number of frames of servo data on each servo track to uniquely identify the servo track within a group of adjacent servo tracks; the number of frames being equal to at least one-half the number of tracks in the group. If the disc contains more than one group of tracks, additional means are provided to identify the particular group to which the servo track belongs. Each data frame consists of a recorded magnetic transition or reversal of magnetic flux which provides servo information at either a first or second location within the data frame. The preferred embodiment described herein also provides an additional recorded magnetic transition at the beginning of each data frame as a synchronization signal. The data tracks are located outside the narrow radial sectors and have radial locations equidistant between those of the servo tracks, i.e., a transducer is correctly positioned over a data track when it is between adjacent servo tracks.

The unique code embedded in the data frames on each track includes, preferably, the requirement of a Gray code encoding, i.e., between the corresponding data frames on adjacent servo tracks, only one pair of corresponding data frames has magnetic transitions not located at the same relative locations within the two data frames. In addition, in the preferred embodiment, a stricter requirement is imposed in that in the adjacent data frames from different tracks within a servo sector, the relative location of the magnetic transitions within the corresponding data frames from the different servo tracks is allowed to change only once every N successive servo tracks where N is the number of data frames per servo track. Thus, for example, if the servo tracks have four data frames, the first data frame for four adjacent tracks will be encoded one way while the next four servo tracks will be encoded the opposite way.

In order to achieve the object of track number identification with a one-half of a track resolution, the present invention uses a dynamic comparator. In the preferred embodiment, the synchronization signals detected by the transducer are negative going pulses while the servo data signals are positive going pulses. When the automatic gain controlled or buffered signal from the transducer, therefore, has its threshold into the comparator set at a positive value, the synchronization signals do not enter the comparator, and the comparator thus compares only the positive going servo signals from the transducer with a positive D.C. voltage equal to a fraction of the peak expected signals into the comparator. Thus, each time that the transducer passes over a radial sector of servo information on the disc, a series of pulses will be produced at the comparator output.

In the preferred embodiment four uniquely encoded data frames are used to uniquely identify eight servo tracks and their adjacent data tracks. If the transducer is positioned over a servo track as it passes over the radial sector, a series of four pulses will therefore appear at the output of the comparator corresponding to the location of the signals within the four data frames of the particular servo track. If the transducer is positioned between servo tracks, five output pulses will be produced from the dynamic comparator, two pulses being produced as the transducer passes over the data frame in which the locations of the signals differ for the corresponding data frames from the adjacent servo tracks. These series of four or five pulses serve as the clock for a shift register.

The data input to the shift register comprises a series of data signals that correspond temporally either to the first possible location for servo signals within the data frames or to the second possible location for servo signals within the data frames or to some predetermined combination of these. The output of the shift register will then be a four or five digit binary number which uniquely identifies the particular servo track within a group or a data track interspersed with the servo tracks. Thus, track identification with a resolution of one-half of a track is accomplished. If the D.C. input to the comparator is set at one-fourth of the peak level of the largest expected positive signals, this resolution is plus or minus one-fourth of a track. The use of multiple comparators having D.C. voltage inputs set at different levels can be used to produce clock signals for the shift register, and in so doing, the plus or minus one-fourth track figure can be reduced.

The encoding of the servo tracks previously described is used to enhance the stability with which a transducer can be maintained on a particular data track. For one selected data frame the peak values of the detected servo signals occurring at times corresponding to the two possible locations for servo information are compared. This data frame is selected so that the servo tracks adjacent to the selected targeted data track have different relative locations for their recorded servo signals in this data frame. Once a selected data track has been accessed, additional circuitry performs this comparison. The output of this circuitry is zero when the transducer is correctly positioned on the selected data track since the detected servo signals corresponding to the data frame are equal. If the transducer drifts out of alignment producing a non-zero voltage output, the circuitry provides feedback to reposition the transducer over the selected data track. There is little chance that the transducer will be repositioned over the wrong data track as the next adjacent stable nulls are located 2N tracks on either side of the selected track as a result of the described encoding.

The novel features which are believed to be characteristic of the present invention, both as to its organization and as to its method of operation, together with further objectives and advantages thereof, will be better understood from the following description considered in connection with the accompanying drawings, in which a presently preferred embodiment of the invention is illustrated by way of example. It is expressly understood, however, that the description of the preferred embodiment and the drawings are for the purpose of illustration and description only, and are not intended as a definition of the limits of the invention.

BRIEF DESCRIPTION OF THE DRAWINGS

FIG. 10 is a table showing the output of the dynamic comparator used in the decoding scheme shown in FIG. 9.

FIG. 11 is a table showing the output of the shift register for the different servo and data tracks within a group.

DESCRIPTION OF THE PREFERRED EMBODIMENT

The present invention relates to a system and method for accessing a transducer to a selected data track on a magnetic disc and for accurately maintaining the transducer in registration with the selected track during the relative rotation of the disc with respect to the transducer. A transducer positioning servo system making use of the present invention achieves, using a minimum of disc space, high accuracy with respect to the detection and identification of the selected track and high reliability with respect to the maintaining of the transducer in alignment with the selected track, and uses a minimum of disc space to do so.

Figure 1:
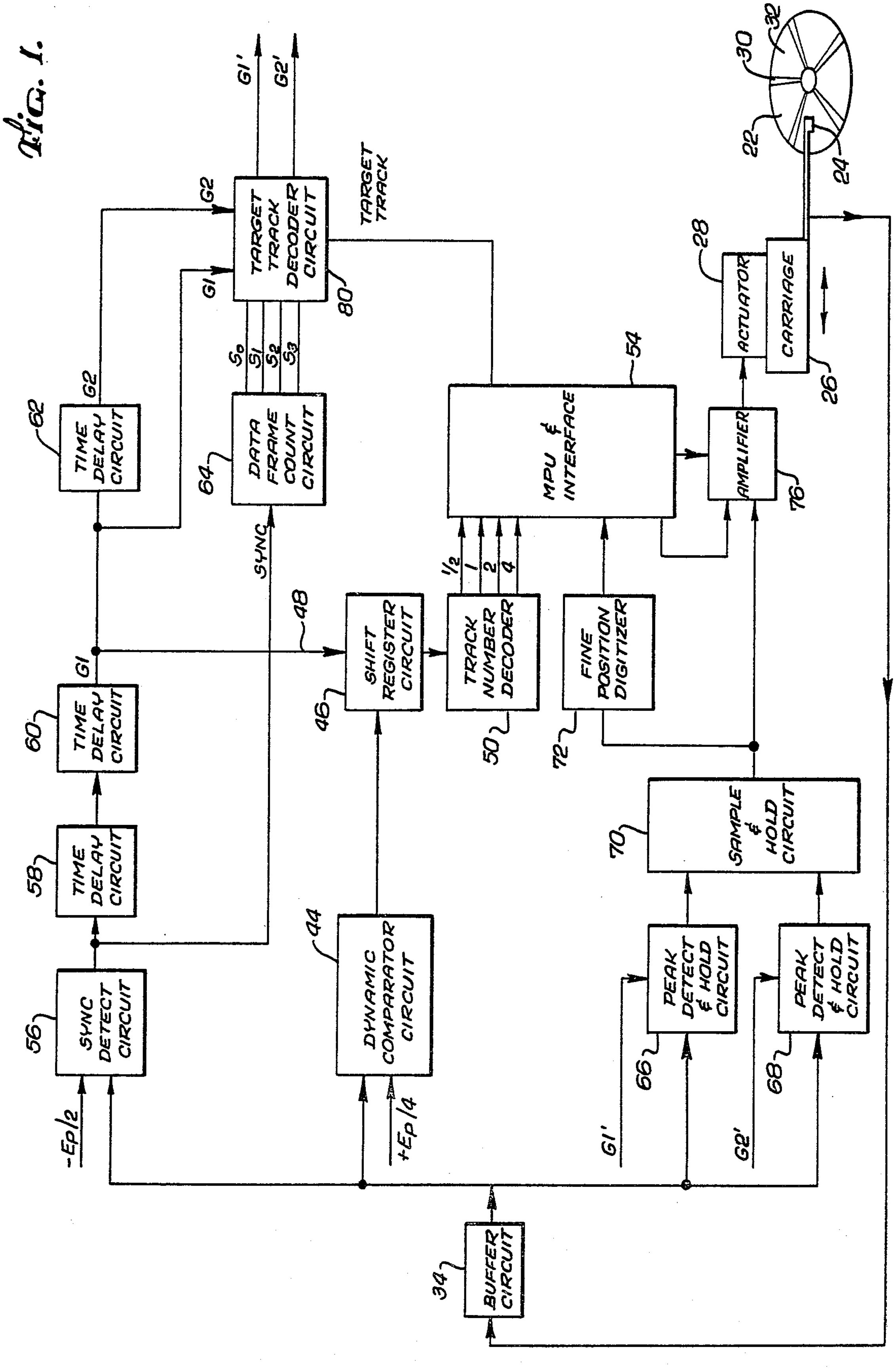
FIG. 1 is a simplified block diagram of a magnetic disc recording and reproducing system in which the present invention is incorporated.

In FIG. 1, a rotatable magnetic disc 22 which contains information recorded on circumferential tracks on the surface of the disc is shown schematically. This information is recorded on the disc 22 and may be reproduced from the disc 22 by means of a transducer 24 which responds to magnetic transitions or reversals of magnetic flux occurring in the surface of the disc.

As illustrated in FIG. 1, in order to position the transducer 24 over a selected circumferential track located on the surface of the disc 22, the transducer 24 is mounted on a carriage 26 which moves the transducer 24 radially with respect to the center of the disc 22. An actuator 28 responsive to electronic signals controls the carriage movement. It will be understood that while the preferred embodiment described herein will be described in terms of a system using a single disc and single transducer, the present invention is applicable to virtually any magnetic recording and reproducing system.

In the preferred embodiment of the present invention, a magnetic disc 22 has servo information encoded upon it in circumferential tracks located within radial sectors 30 of the disc surface, as shown in FIG. 1. In the areas 32 between the radial sectors 30, working data or information is encoded onto the disc 22, also on circumferential tracks. Although located in different areas of the disc it is preferred that these data tracks be located radially between the servo tracks so that a transducer is correctly radially aligned with a data track when it is radially equidistant from two adjacent servo track locations.

The encoded servo tracks are designated, within a group of uniquely encoded tracks, by half integer numbers, such as 0.5, 1.5, 2.5, etc. with the designation ST placed before them. The data tracks, located radially between the servo tracks, are designated by integers, such as 0.0, 1.0, 2.0, etc., with the designation DT preceeding the number. Tracks from other groups of tracks located on the disc are designated herein by a prime, such as ST 7.5' or a double prime ST 7.5". Thus, tracks ST 7.5, ST 7.5', and 7.5" would all be identically encoded but would be distinguished from one another by means noting the particular group to which the track belonged.

As the disc 22 rotates, therefore, the transducer 24 is positioned over successive radial sectors 30 of servo information. The servo information acquired by the transducer 24 as it passes over the radial sectors 30 is processed to produce control signals for the actuator 28, enabling the carriage 26 to move the transducer 24 to a desired radial position, as will be described.

A primary objective of any transducer positioning servo system depending upon servo information encoded on the disc alongside the working data is that the servo information take up as little space on the disc as possible, as this space is unavailable for the storage of working data. Since a rotating magnetic disc on which information is recorded on tracks may contain from less than forty to more than several hundred different data tracks, uniquely identifying each track on the disc by means of servo information encoded on the surface would require too much space on the disc. In the preferred embodiment of the present invention, therefore, servo tracks in the radial sectors on the disc are grouped into groups of eight successively positioned adjacent tracks and uniquely identified within the group by means of a magnetic encoding.

A minimum number of tracks in such a group of tracks is determined by the maximum possible radial movement of the transducer between successive radial sectors. In order to prevent any ambiguity that could result from the transducer being successively positioned on successive radial sectors on tracks having the same code but from different groups, the radial distance covered by a group of uniquely encoded tracks should exceed twice the maximum possible radial movement of the transducer between radial sectors. Also, a means for keeping track of which one of the similarly encoded tracks the transducer is aligned with is required. Preferrably, a microprocessor can be used to accumulate the actual track numbers as the transducer moves radially, thereby providing a means for identifying the particular group in which a particular track is located.

In the preferred embodiment of the present invention in which eight successively positioned tracks are to be uniquely identified, four data frames per radial sector for each track are used. Each track is uniquely encoded by servo information in the four data frames in order to enable a transducer to be accessed to a selected track within the group and to follow that track accurately.

Figure 2:
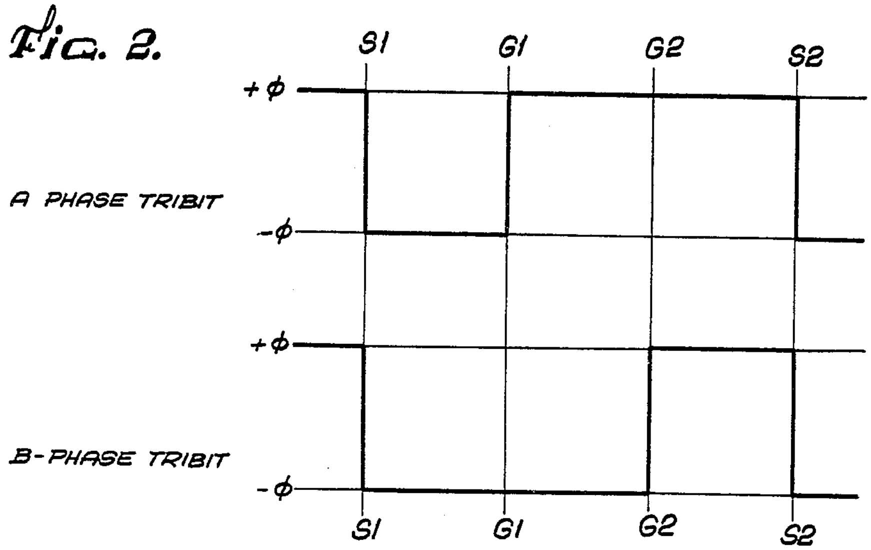
FIG. 2 illustrates the two possible magnetic encodings for a servo data frame on a magnetic disc using the preferred tribit encoding.

Although many methods of encoding can be used with the present invention, it is preferred to use tribit encoding, with each data frame consisting of a single tribit. The use of tribit encoding on servo tracks in connection with positioning systems for transducers was described in U.S. Pat. No. 3,691,543 issued to Mueller. Each tribit consists of three possible locations for signals. At the beginning of each tribit, a synchronization signal is recorded. The other two locations for signals are for servo information data and, in each tribit, a signal is recorded at either one or the other of these locations. Thus, each tribit can be encoded in one of two possible ways.

Where the transducer is a magnetic head using a gap, the signals encoded onto the servo tracks are reversals of magnetic flux occurring at specific locations. FIG. 2 illustrates the two possible magnetic encodings for a servo data frame on a magnetic disc in which the described tribit encoding is used. As shown in FIG. 2, the magnetic flux $\phi$ reverses direction at the beginning of each tribit, indicated in FIG. 2 by S1 and S2, to produce a synchronization signal. The locations for possible servo information signals at which the magnetic flux would again reverse are at positions G1 and G2 as shown in FIG. 2. For the first possible encoding, termed the A-phase tribit, the magnetic flux reverses from negative to positive at the first location G1 for possible servo information. For the other possible encoding, termed the B-phase tribit, the magnetic flux reverses from negative to positive at the second location G2 for possible servo information.

Because a flux reversal is required for each tribit at either the first or second location for servo information, the synchronization signals for adjacent tribits have the same polarity, which is opposite to the polarity of the servo information signals themselves which occur at either the first or second possible locations for servo information in each tribit.

Figure 3:
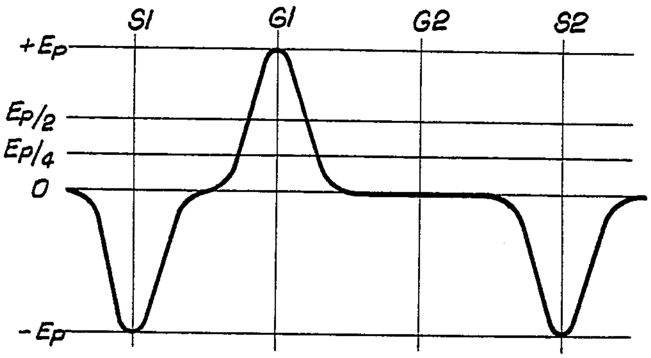
FIG. 3 illustrates the signal from a transducer moving directly over a data frame on a servo track in which the A-phase tribit of FIG. 2 has been encoded.
Figure 4:
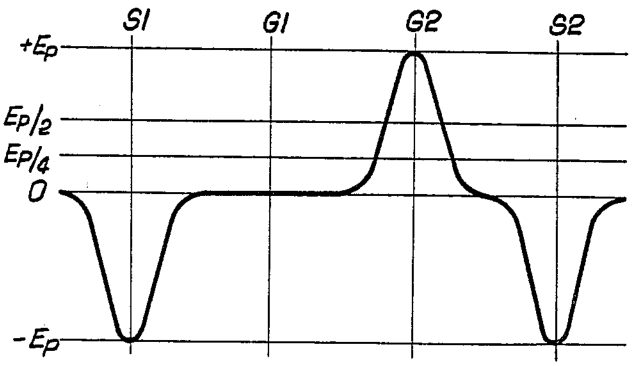
FIG. 4 illustrates the signal from a transducer moving directly over a data frame on a servo track in which the B-phase tribit of FIG. 2 has been encoded.

In the preferred embodiment of the present invention, each data frame on the servo tracks consist of either a single A-phase tribit or a single B-phase tribit. FIGS. 3 and 4 illustrate, respectively, the signals resulting from a transducer which is moving along a servo track directly over a data frame consisting of an A-phase tribit and a B-phase tribit. Thus, a negative synchronization pulse of amplitude $E_p$ is produced when the transducer passes over the flux reversal at position S1, while a positive pulse of amplitude $E_p$ is produced at either position G1 or G2, when the transducer passes over those positions.

If the transducer is not radially positioned directly over a servo track, but instead is radially positioned equidistant from two adjacent servo tracks, so that it is actually in radial alignment with a data track, the transducer will average the signals from the adjacent data frames on the two servo tracks. If the adjacent data frames are both encoded with the A-phase tribit, the transducer output will include a positive pulse of amplitude $E_p$ as shown in FIG. 3, while if the two adjacent data frames are both encoded with the B-phase tribit, the transducer output will include a positive pulse of amplitude $E_p$ as shown in FIG. 4. If, however, one of the adjacent data frames is encoded with the A-phase tribit and the other with the B-phase tribit, the transducer output signal will have the form shown in FIG. 5 in which positive going pulses appear at both the first and second locations for servo information and have an amplitude of $E_p/2$. The relative amplitudes of the positive going pulses in FIG. 5 that appear at the first and second locations G1 and G2 for servo information will vary as the transducer is moved closer to one servo track or the other.

Figures 6, 9:
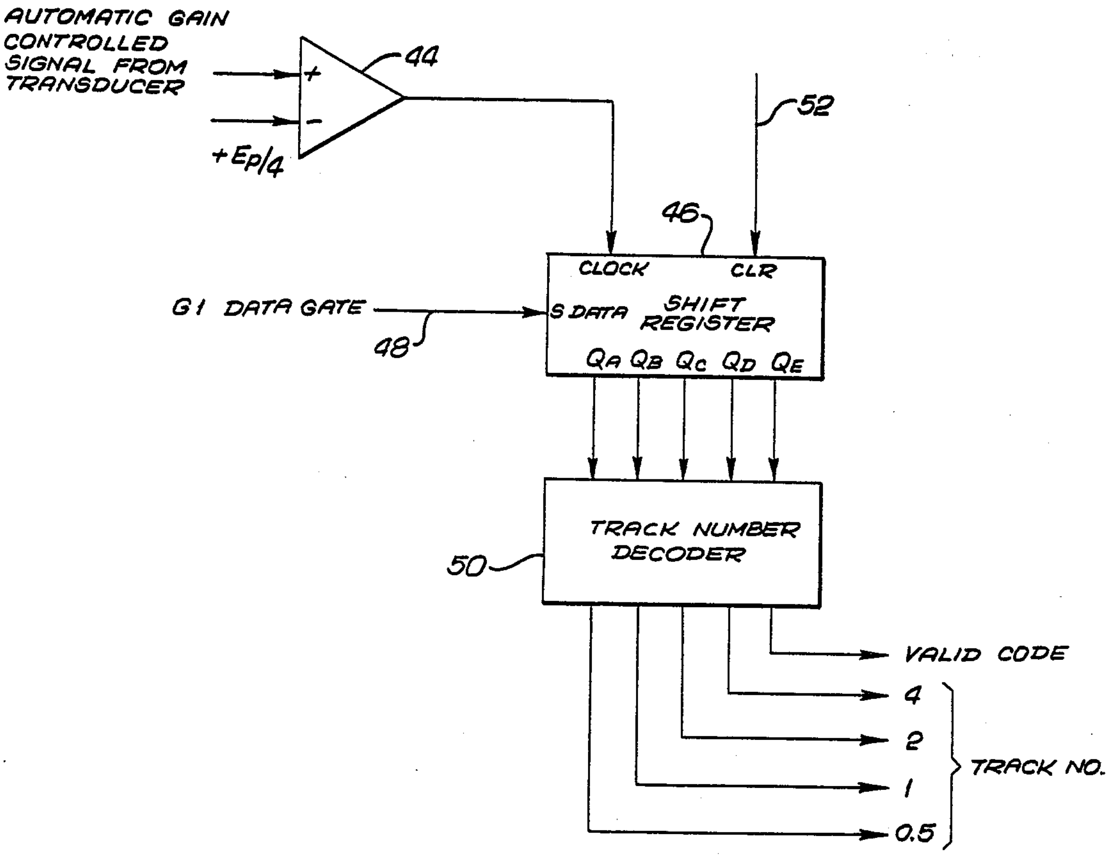
FIG. 6 is a table showing a preferred servo data encoding pattern for recording servo data on a plurality of adjacent servo disc tracks in accordance with the invention.
FIG. 9 is a simplified block diagram for the decoding scheme used for fractional track detection and identification in the present invention.

As mentioned, each data frame within a radial sector on each of the servo tracks from a group of servo tracks is encoded with either the A-phase or B-phase tribit. The table in FIG. 6 shows a preferred encoding of the data frames on the servo tracks within a group. As shown in the table in FIG. 6, the encoding for successive servo tracks differs within only one pair of adjacent frames. However, the coding used is more strict than the Gray code in that the encoding for adjacent data frames on adjacent tracks does not vary with the frequency that is permitted by the Gray code. Instead, the variation within each data frame over the successive servo tracks is cyclical with the A-phase tribit being encoded on four adjacent tracks followed by the B-phase tribit being encoded on the following four adjacent tracks.

Figure 7:
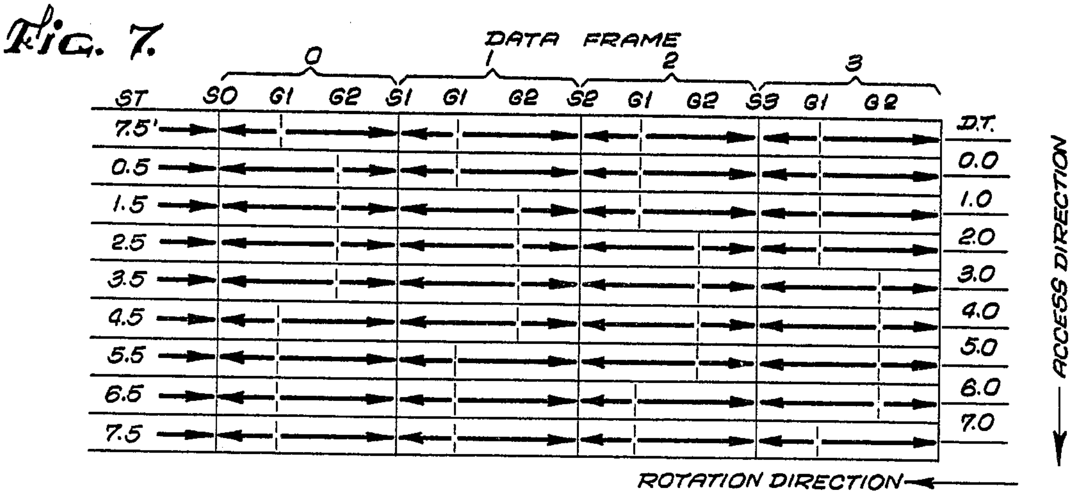
FIG. 7 illustrates schematically a portion of a disc having a preferred servo data encoding pattern for recording servo data on a plurality of servo disc tracks in accordance with the invention.

FIG. 7 is a schematic representation of a portion of a radial sector containing servo information. The horizontal arrows represent the direction of magnetic flux with the vertical lines in each disignated servo track representing the positions of the reversals of the magnetic flux or magnetic transitions. Thus, at the beginning of each data frame, a negative magnetic transition serving as a synchronization signal occurs on each track at the positions labeled S0, S1, S2, and S3. If the tribit encoding for a particular data frame of a servo track is the B-phase tribit, the magnetic transition is indicated by a vertical line in the data track occurring at the second possible location for servo information within the data frame, i.e., at the location labeled G2, such as is shown for example with respect to data frame 0 for servo track ST 0.5. Conversely, if the data frame is encoded with the A-phase tribit, the magnetic transition occurs at the first location for servo information within the data frame, i.e., at the location labeled G1, such as is shown for example with respect to data frame 1 of servo track ST 0.5.

Figure 8:
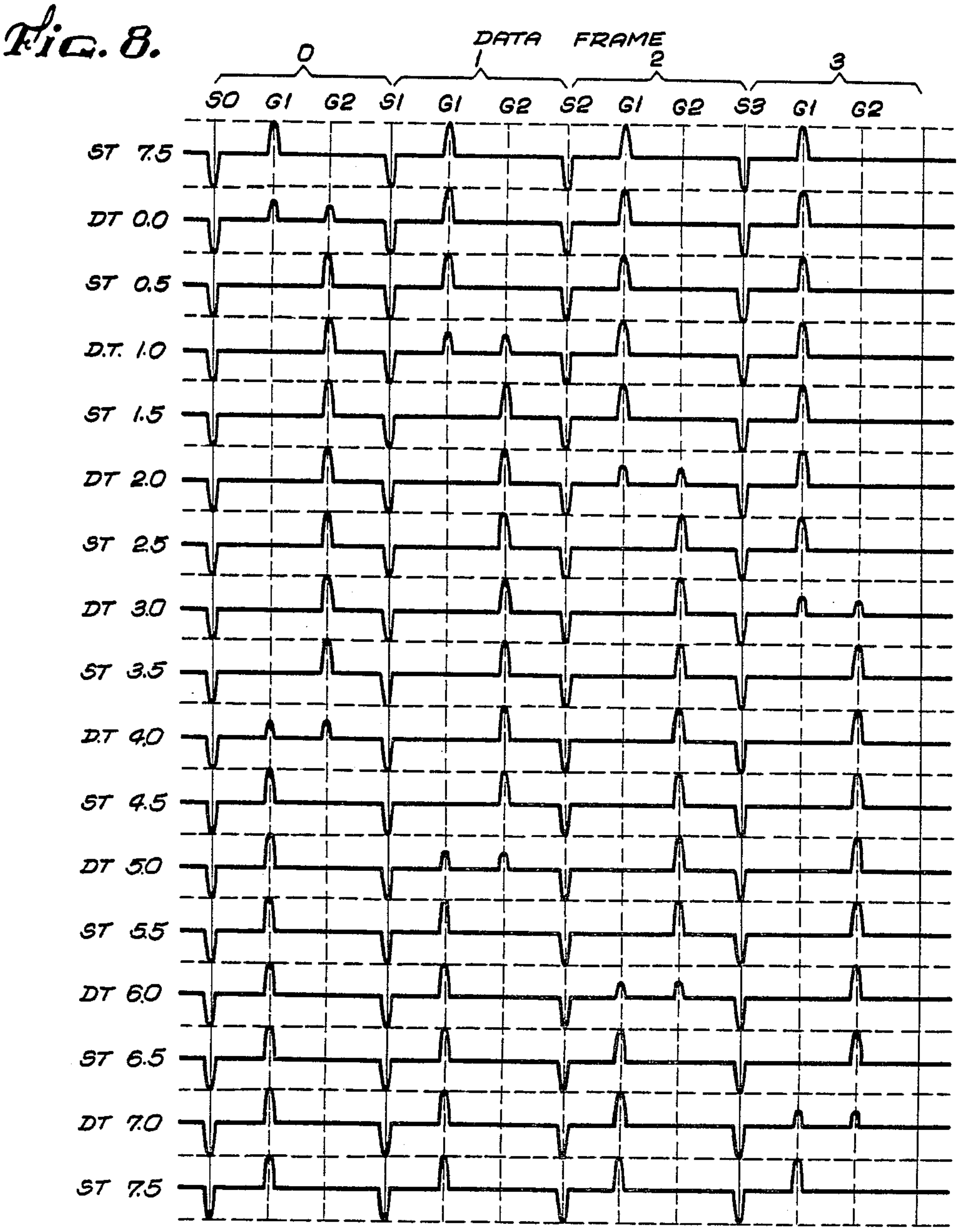
FIG. 8 is a series of graphs illustrating the detected signals obtained for different positions of the transducer in response to the servo data encoding pattern of FIGS. 6 and 7.

In FIG. 8, the detected signals from a magnetic transducer that is radially positioned over the various servo tracks in a group and over the interspersed data tracks while the magnetic disc is rotating is shown. Thus. if the transducer is radially positioned directly over servo track ST 0.5 and moving along that track, as the transducer crosses the beginning of each data frame, a negative synchronization pulse of amplitude $E_p$ occurs as shown in FIG. 8. A positive pulse of amplitude $E_p$ occurs in the first data frame (data frame 0) corresponding to the second possible location G2 at which a magnetic transition providing servo information could occur. For data frames 1, 2, and 3 positive pulses of amplitude $E_p$ occur at times corresponding to the first possible locations G1 in those data frames.

If, while the disc is rotating, the transducer is radially positioned in alignment with a data track and thus equidistant between two servo tracks, the output from the transducer will contain positive going pulses at times corresponding to both G1 and G2 for one of the four data frames of an amplitude equal to $E_p/2$. This signal results from the transducer being positioned between adjacent servo tracks rather than directly over either one so that the contributions from each of the adjacent data tracks to the signal are averaged. At times corresponding to G1 and G2 for the other three data frames, one positive going pulse of amplitude $E_p$ per data frame occurs.

Fractional track identification is accomplished through use of the output signals from the transducer as it passes over a radial sector and produces signals corresponding to a radial location with respect to the encoded servo tracks. The output signals from the transducer are processed in an automatic gain control circuit or buffer 34 shown in FIG. 1 so that the negative going synchronization pulses have an amplitude of −4 volts.

A block diagram of the decoding scheme used in order to identify the servo track or the data track over which the transducer is positioned is shown in FIG. 9 which shows a portion of the block diagram of FIG. 1. The output of the automatic gain control circuit or buffer 34 shown in FIG. 1 serves as an input to a dynamic comparator circuit 44. The other input to the dynamic comparator 44 is a D.C. voltage equal to $\frac{1}{4}$ of the peak positive pulse that can be expected from the automatic gain control circuit 34, i.e., one volt. This voltage determines the threshold of the dynamic comparator 44; only those pulses entering the dynamic comparator 44 that have a value greater than the comparator threshold of one volt will produce an output signal from the dynamic comparator 44. The output of the dynamic comparator 44 is digital so that pulses of fixed amplitudes are produced for all input pulses greater than one volt.

Synchronization pulses, having a negative amplitude, produce, therefore, no output from the dynamic comparator 44. Hence, the output pulses from the dynamic comparator 44, correspond to the location of the recorded servo signals within the data frames of the servo track or tracks over which the transducer is traversing. These digitized servo pulses from the dynamic comparator 44 are used as clock pulses for a shift register 46. It will be noted by reference to FIGS. 5 or 8 that if the transducer 24 is radially positioned over the location of a data track, five clock pulses are produced at the output of the dynamic comparator 44 while if the transducer 24 is radially positioned over the location of a servo track, four clock pulses are produced at the output of the dynamic comparator 44.

The table in FIG. 10 shows the location of the clock pulses produced at the output of the dynamic comparator 44 as a function of the times H1 and H2 corresponding respectively to the locations G1 and G2 of possible servo signals within each data frame. The presence of an output from the dynamic comparator 44 at a time H1 or H2 in any of the data frames is indicated in the table in FIG. 11 by the letter C.

The data input or gate 48 to the shift register, in the preferred embodiment, consists of a series of pulses corresponding in time to the first locations G1 for the four data frames within a radial sector. This series of pulses is obtained from the synchronization signals. Referring to FIG. 1, the synchronization signals from the transducer are detected by the sync detector circuit 56, which produces an output only for those signals entering it which have a larger negative amplitude than $-E_p/2$. The output of the sync detector 56 is delayed by time delay circuits 58 and 60 so that the output of time delay circuit 60 is a series of pulses corresponding in time to the first locations G1 for servo information within the data frames in a radial sector. This series of pulses is used as the G1 data input 48.

The shift register circuit 46 temporarily registers the presence or nonpresence of pulses at the G1 data gate during the occurrence of the clock pulses. If there is a pulse at the G1 data input 48 during the occurrence of the first clock pulse from the dynamic comparator 44, a signal corresponding to a binary one is registered in the first register QA of the shift register 46. If there is no data input occurring at the time of the first clock pulse, the information is recorded in the register QA as a binary zero. When the second clock pulse occurs, the signal stored in the first register QA is shiftted to the second register QB and a binary zero or one is stored in register QA, depending upon whether there is an input corresponding to the clock pulse or not. This process continues until the last clock pulse originating from the the transducer as it traverses the radial sector has resulted in the storage of a binary zero or one in the register QA along with the other stored binary digits. At this point there is then present in the register QA through QE of the shift register a four or five digit binary number.

The output of the shift register 46 for the various servo and data tracks in a group for the G1 data input 48 into the shift register 46 is shown in the table in FIG. 11. FIG. 11 can best be understood with reference to FIG. 10, which shows the presence or nonpresence of the clock pulses at the times corresponding to the possible occurrences of servo signals. Thus, for example, with reference to data track DT 0.0, there are five clock pulses so that the information registered during the occurrence of the first clock pulse will be eventually shifted to the QE register.

If, for example, the transducer is positioned radially over data track DT 0.0, the first clock pulse occurs simultaneously with a pulse from the G1 data gate so that a binary one is recorded and registered in QA and later shifted to QE. The second clock pulse for data track DT 0.0 occurs at a time corresponding to the second location, G2, of data frame 0 at which time there is no input into the shift register from the G1 data input 48 since that input for the preferred embodiment consists of pulses occurring at times corresponding to the G1 locations of the data frames only. Thus, a binary zero will be registered in register QA and eventually shifted to register QD. The last three clock pulses of data track DT 0.0 occur at times corresponding to the G1 locations of data frames 1, 2, and 3 respectively so that binary ones will be registered in registers QC, QB, and QA respectively. Hence the binary number 10111 is registered for data track DT 0.0.

For servo track ST 0.5, ony four clock pulses are produced. Hence, register QE remains empty while the data corresponding to the first clock pulse is shifted only over to the QD register. Since the first clock pulse for track ST 0.5 occurs at a time corresponding to the second location of a possible servo signal in data frame 0, a binary zero is registered in register QA and eventually shifted over to register QD. However, for the other three data frames, data frames 1, 2, and 3, clock pulses occur at times corresponding to the first locations for possible servo signals within the data frames so that binary ones are produced and registered in registers QC, QB, and QA respectively. In the case of a servo track in which only four of the registers are used, the absence of information in the last register QE is considered as a zero. The binary number 00111 is therefore registered for servo track ST 0.0.

Thus, as shown in FIG. 11, a unique binary number is produced for each servo track within a group of servo tracks and for the corresponding data tracks interspersed among those servo tracks.

An additional signal 52 originating from either the synchronization signals or from an additional magnetic transition embedded upon the servo tracks of the disc is used to dump the binary number in the shift register 46 into a track number decoder or memory circuit 50 where it is processed to produce a track identification number. Thus, track identification to the nearest one half of a track is achieved. The track identification number proceeds to an interface and microprocesser unit 54, as shown in FIG. 1, where it is compared to the number of the selected data track. An analog signal is produced and applied through amplifier 76 and associated electronics not shown in FIG. 1 to appropriately move the transducer 24 radially along the disc 22 to a selected track, according to methods well known in the art.

In the preferred embodiment, the accuracy of the fractional track detection is plus or minus $\frac{1}{4}$ of a track. This level of accuracy is achieved with a single dynamic comparator 44 whose threshold level is set at one-fourth the expected peak input voltage of a positive pulse.

Figure 5:
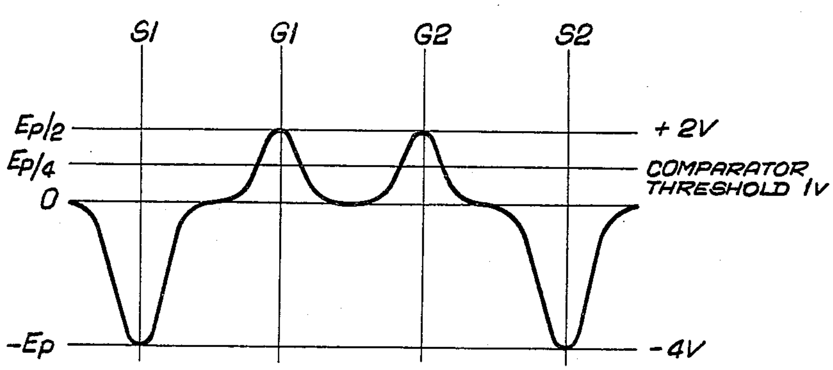
FIG. 5 illustrates the signal from a transducer moving along a data track between the two adjacent data frames on the adjacent servo tracks that are differently encoded.

This can be understood by considering that if the transducer 24 is aligned radially over a data track, the input pulses to the dynamic comparator 44 corresponding to the one data frame in which the two adjacent servo tracks have servo information signals located at different positions have amplitudes of one-half of the peak expected input pulse amplitude such as is shown in FIG. 5. If the transducer 24 moves radially away from alignment with the data track by $\frac{1}{4}$ of a track, one of the input pulses in the frame will increase in amplitude to approximately $\frac{3}{4}$ of the peak expected input pulse amplitude and the other will decrease in amplitude to approximately $\frac{1}{4}$ the peak expected input pulse amplitude. So long as the latter pulse is above $\frac{1}{4}$ the value of the peak expected input pulse, an indication that the transducer 24 is radially aligned with the data track will be given, as the output of the dynamic comparator 44 will contain the five pulses characteristic of the particular data track.

If the transducer 24 moves radially with respect to the data track slightly further towards one of the adjacent servo tracks, one pulse's amplitude will fall below ¼ of the peak expected input pulse amplitude and the output of the dynamic comparator will now consist of the four pulses characteristic of the servo track and the track indication given will be that of alignment with the servo track even though the transducer 24 may at that point be as much as ¼ track out of radial alignment with the servo track. Thus with the preferred embodiment, the radial location of the transducer may be identified to within plus or minus ¼ of a track.

Even greater accuracy is possible with the present invention through the use of additional hardware. Greater accuracy can be achieved by the use of multiple comparators mounted in parallel with different threshold voltages and by additional further signal processing equipment to combine the outputs of the comparators to produce a clock signal for the shift register.

Once the transducer has been placed into proximity with selected tracks the transducer must be maintained in alignment with that track. The same servo data, differently processed, is used for maintaining the transducer in alignment with the selected data track as was used to assist the transducer in accessing the selected data track. This function is enhanced by the special encoding of the data frames as have been previously discussed. In the preferred embodiment, position detector circuitry compares the amplitude of the pulse at the first location for servo information with the amplitude at the second location in one preselected data frame and provides feedback to reposition the transducer as necessary. This comparison is begun and the track identification and accessing function is stopped when a signal from the microprocessor indicates that the selected data track has been accessed.

The particular data frame in which the comparison is made by the position detector circuitry depends upon the selection of the data track with which it is desired to position the transducer in alignment. The data frame chosen for the comparison is that for which the servo tracks adjacent to the selected data rack have recorded servo signals from the transducer appearing at different locations within the data frame. Thus, as can be seen by reference to FIG. 8, if data track DT 4.0 is the selected data track, for example, data frame 0 is chosen for the comparison.

Referring to FIG. 1, an electrical signal representing the selected data track is sent through the microprocessor unit and interface 54 to a target track decoder circuit 80. Detected synchronization signals from sync detector 56 are also sent through a data frame counter 64 to the target track decoder 80. Time delayed synchronization signals representing times H1 and H2 corresponding to the G1 and G2 locations for servo signals within the data frames are applied to the target track decoder 80 from time delays 60 and 62 respectively. In response to the applied signal representing the selected data track, target track decoder 80 produces a pair of output signals, each of which comprises a single pulse synchronized to the signal from the transducer 24. For each radial sector traversed by transducer 24, each of the outputs G1′ and G2′ from the target track decoder 80 comprises a single pulse precisely located with respect to the synchronization signals detected by the transducer and produced at the output of the buffer 34.

The temporal locations of the G1′ and G2′ pulses with respect to the synchronization signal detected by the transducer 24 and appearing at the output of the buffer 34 depends upon the target track selected. Thus, if data track DT 4.0 is the selected data track, the G1′ pulse occurs at the time corresponding to the first possible location within data frame 0 for a servo signal while the G2′ pulse corresponds to the second possible location within data frame 0 for a servo signal since for data frame 0, the servo tracks adjacent to data track DT 4.0 have servo signals differently located for this data frame, as can be seen with reference to FIG. 8. The pulses are applied to peak detect and hold circuits 66 and 68, the inputs of which receive the buffered signal from the transducer. The G1′ pulse gates the peak detect and hold circuit 66 at a time corresponding to the first possible location for a servo signal in data frame 0, so that the peak of a signal from the transducer occurring at such a time will be detected and held in circuit 66. Similarly, the G2′ pulse gates the peak detect and hold circuit 68 at a time corresponding to the second possible location for a servo signal in data frame 0 so that a detected servo signal from data frame 0 occurring at a time corresponding to such location will have its peak detected and held in circuit 68. Sample and hold circuit 70 and fine position digitizer 72 produce an output indicative of the difference between these peaks. This output will be zero when the transducer is aligned with data track DT 4.0, and will be positive or negative if the transducer drifts away from alignment with that data track.

If the selected data track is data track DT 0.0, the G1′ and G2′ pulses from the target track decoder 80 will be reversed, i.e., the G1′ pulse will occur at a time corresponding to the second possible location for servo information in data frame 0 while the G2′ pulse will occur at a time corresponding to the first possible location for servo information in data frame 0. The output of the sample and hold circuit 70 and fine position digitizer 72 will then be zero if the transducer maintains its alignment with data track DT 0.0 and will have a non-zero value if the transducer drifts out of alignment with that data track.

This output voltage is used to provide a feedback signal to the actuator which moves the carriage to radially adjust the position of the transducer. Thus, if the transducer drifts from alignment with data track DT 4.0 in a direction towards servo track ST 4.5 the output voltage becomes slightly positive. This positive voltage is fed back to the actuator through amplifier circuitry 76 and associated components where it causes the actuator to move the carriage so that the transducer is moved back into alignment with data track DT 4.0. The electronic components which allow this signal to be applied to the actuator in order to correct the radial positioning of the transducer are well-known in the art and will not be described herein.

If a different data track is selected, the output pulses from the target track decoder 80, G1′ and G2′, will correspond to the first and second possible locations for servo information signals in other data frames. For example, if data track DT 6.0 is selected, the G1′ and G2′ pulses correspond to the locations of the first and second possible locations for servo information signals in data frame 2, as can be determined by reference to FIG. 8.

Figure 13:
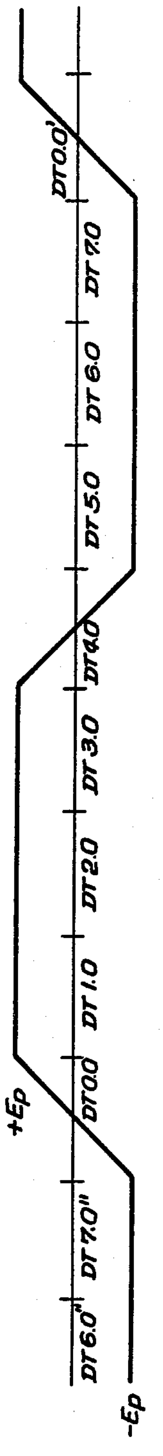
FIG. 13 shows the typical analog output for a position detector with data track four (DT 4.0) as the targeted track.

As shown in FIG. 13, when the transducer is correctly positioned radially over data track DT 4.0, the detected signal pulses from the transducer corresponding to the first and second locations within data frame DT 0.0 are equal so that the comparison results in a zero difference voltage and output. As the transducer moves radially toward servo track ST 4.5, the difference voltage decreases since the pulse at the G1 location increases in amplitude while the pulse at the G2 location decreases in amplitude. The voltage reaches a maximum negative value when the transducer is positioned over servo track ST 4.5. Similarly, as the transducer moves radially toward servo track ST 3.5, the output voltage increases reaching a maximum positive value when the transducer is positioned radially in alignment with servo track ST 3.5.

It will be noted from FIG. 13 that the output voltage is zero when the transducer is aligned with data track DT 0.0 and data track DT 0.0″ as well as data track 4.0. However, the slope of the voltage curve is opposite when the transducer the aligned with the data track DT 0.0 and DT 0.0″ to what it is when the transducer is aligned with data track DT 4.0. For data tracks DT 0.0 and DT 0.0″, therefore, the feedback is regenerative so that the transducer tends to moves out of alignment with these data tracks. Thus, an error signal, i.e., a positive or negative voltage at the output, is effectively generated over eight tracks on either side of the selected data track DT 4.0; the data tracks DT 4.0′ and DT 4.0″ located in the groups on either side are the nearest stable nulls, i.e., positions at which the error signal is zero and the slope of the voltage is in a direction tending to align the transducer to the data track.

Figure 12:
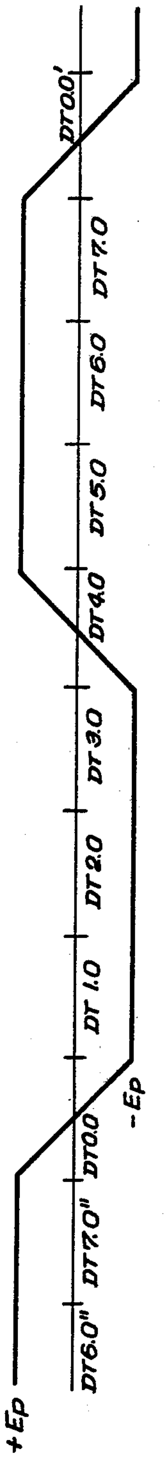
FIG. 12 shows the typical analog output for a position detector with data track zero (DT 0.0) as the targeted track.

If data track DT 0.0 is selected, the data frame 0 is still used for the comparison of amplitudes of servo information signals. The signals for the comparison are reversed, as has been described, in order that the slope of the output voltage curve be in the proper direction, as shown in FIG. 12, to provide the required feedback voltage.

It will be appreciated that the distance between the stable nulls is a result of the specific encoding chosen for the servo tracks within a radial sector. If the Gray code were used, the positioning of the servo information signals encoded onto the servo tracks could vary between the first and second locations within the data frames of adjacent tracks with greater frequency, thus resulting in the stable nulls being positioned radially closer together. With the preferred method of encoding, however, the same encoding is used in the data frames of four adjacent tracks before the opposite encoding is used for that data frame for the next four adjacent tracks. There is thus less of a chance, with the preferred embodiment, that the transducer will be erroneously maintained in alignment with a nonselected data track.

The specific encoding of the servo tracks within a group in a radial sector provides, theoretically, less capacity per data frame than a Gray code encoding would. The use of the Gray code would provide a total of $2^N$ unique encodings where N is the number of data frames, while, with the presently preferred encoding, 2N unique encodings are possible. However, since the maximum number of tracks in any uniquely encoded group need only exceed twice the number of tracks which the transducer can traverse between radial sectors, the limitation on the theoretical capacity of the present method of encoding is largely irrelevant. It should also be noted that in the system described in U.S. Pat. Nos. 4,027,338 and 4,032,984, one data frame must be used for track following only and therefore such systems have, at best, a capacity of $2^{N-1}$. Where N is four as in the preferred embodiments herein and in the system described in those patents, both systems can uniquely encode eight tracks in a group.

Since the same encoding appears on a track in each group of tracks, it is necessary to monitor which of the similary encoded tracks from the various groups the transducer is aligned with. This can be accomplished by means of a microprocessor which can be used to accumulate the track identification numbers. The ability of the microprocessor to keep an accurate count of the actual track numbers depends upon the radial rate of motion of the transducer. The maximum permissible rate of motion of the transducer in order to permit accumulation by the microprocessor will depend upon the rate of rotation of the disc, the number of radial sectors of servo information on the disc and the number of data frames per track in each radial sector.

While the present invention has been described in terms of a presently preferred embodiment, other configurations and variations are within the scope of the present invention, some of which have already been indicated. For example, the fractional track detection which is made possible by the present invention is achieved whether or not the specific method of encoding presently preferred is used or if another encoding, such as the Gray code is used, although the separation of stable nulls would be decreased if some other encoding were used. As another example the present invention makes use of tribit encoding because this encoding advantageously provides synchronization signals along with servo information signals within each data frame. However, many other methods of encoding, such as the uni-polar dibit could be used in the present invention and the same results in terms of fractional track detection and position detector stability would still be achieved. Thus, it is intended that the claims not be limited to the specific preferred embodiment discussed herein.

We claim:

1. A servo system for accurately positioning a transducer means radially in alignment with a selected data track on a magnetic disc having one or more groups of successively positioned partially circumferential servo tracks and data tracks having radial locations interspersed with said servo tracks, said selected data track being located in a said group and said disc moving relatively to said transducer means comprising:

a plurality of adjacent data frames of recorded servo signals located on each servo track, each said data frame on a servo track located adjacent to and aligned with a corresponding data frame on adjacent servo tracks, and encoded by having recorded thereon magnetic servo signals of the same sense at either a first or a second location within said data frame, said corresponding first and second locations of said adjacent data frames on adjacent tracks being aligned and located along the same radii, said data frames being encoded with said recorded servo signals so that said tracks within a said group are uniquely encoded and identifiable thereby, said transducer means producing detected servo signals of the same sense responsive to said recorded servo signals, said detected signals being indicative of the radial position of said transducer means relative to said servo and data tracks;

at least one set of recorded magnetic synchronization signals, said magnetic synchronization signals of the opposite sense of said magnetic servo signals on said disc, one synchronization signal of each set being located on each servo track with said synchronization signals of each set being radially aligned with one anothr on said tracks, said transducer means producing detected synchronization signals responsive to said recorded synchronization signals of the opposite sense to said detected servo signal;

positioning means for moving said transducer means radially with respect to said disc; and a first means for detecting the radial location of said transducer means from said detected servo signals and for providing signals to said positioning means responsive to said 40 detected servo signals, said first means for detecting comprising:

means coupled to said transducer means for producing digitized clock pulses at times corresponding to the times of said detected servo signals detected by said transducer means;

a means for producing a fixed series of pulses from said detected synchronization signals, said fixed series of pulses containing a pulse corresponding to each adjacent data frame on a servo track, said pulse occurring at a time corresponding to either the first or second location for recorded servo signals within each data frame;

a shift register having its clock input coupled to said means for producing digitized clock pulses and its data input coupled to said means for producing a fixed series of pulses, whereby said shift register registers a binary number characteristic of the radial position of said transducer means relative to said servo and data tracks in a group; and means for identifying the servo or data track with which said transducer means is radially aligned from said binary number characteristic of the radial position of said transducer means and for providing a signal to said positioning means in order to move said transducer means radially toward alignment with said selected data track.

2. A servo system as in claim 1 further comprising:

a second means for detecting the radial location of said transducer means and for providing signals to said positioning means responsive to the detection by said transducer means of said recorded signals, said second means comparing the detected servo signals corresponding to said recorded servo signals at said first and second locations produced by said transducer means during a time period corresponding to one selected data frame, and producing an output signal proportional to the difference in said detected servo signals for said one selected data frame, said data frame being selected so that said servo tracks adjacent to said selected data track have recorded servo signals in said corresponding data frames at different locations within said corresponding data frames, said output signal being provided to said positioning means for maintaining said transducer means radially in alignment with said selected data track.

3. A servo system as in claim 2 wherein said corresponding data frames on successive servo tracks have recorded servo signals at said first or second locations within said corresponding data frames that are at the same corresponding locations over a number of successively positioned servo tracks, said number of successively positioned servo tracks being equal to the number of adjacent data frames on a servo track.

4. A servo system as in claim 3 wherein said data tracks are radially located equidistant between two adjacent servo tracks and said output signal of said second means is zero if said transducer means is in radial alignment with said selected data track and said second means for detecting provides negative feedback to said positioning means to radially adjust said transducer means when said transducer means is out of radial alignment with said selected data track.

5. A servo system as in claim 1, wherein said means coupled to said transducer means for producing digitized clock pulses comprises at least one comparator, the first input of which is coupled to said transducer means and the second input of which is a D.C. voltage of the same sense as said detected servo signals.

6. A servo system as in claim 5 wherein said data tracks are radially located equidistant between two adjacent servo tracks and are radially separated from each other by one track and from adjacent servo tracks by one half of a track. and wherein said at least one comparator is one comparator having a D.C. voltage applied to the second input equal to $\frac{1}{4}$ the peak expected amplitude of detected servo signals into the first input, whereby a digitized clock pulse is produced whenever a detected servo siagnal has an amplitude into the first input greater than said D.C. voltage applied to the second input so that said servo and data tracks within a group can be identified with an accuracy of plus or minus $\frac{1}{4}$ of a track.

7. A servo system as in claim 1 wherein said servo tracks are located within a plurality of radial sectors on said disc and said data tracks are located outside said sectors.

8. A servo system as in claim 1 wherein a said recorded synchronization signal is located at the beginning of each said data frame.

9. A servo system as in claim 1 wherein said recorded synchronization signals and servo signals are locations of magnetic flux reversals on said disc.

10. A method for accurately positioning a radially movable transducer means into radial alignment with a selected data track on a magnetic disc moving relatively to said transducer means and having one or more groups of successively positioned servo tracks and data tracks radially interspersed with said servo tracks, said selected data track being located in one said group, said servo tracks within a group having magnetically recorded synchronization signals thereon and being uniquely magnetically encoded by the positioning of magnetically recorded servo signals at circumferential locations on said disc, said recorded synchronization and servo signals being located in at least one radial sector on said disc, said transducer means producing detected servo signals and detected synchronization signals from said recorded servo signals and synchronization signals, respectively, on said one or two closest servo tracks as said at least one radial sector of said disc moves relatively past said transducer means, said detected servo signals from said transducer means being characteristic of the radial location of said transducer means relative to said servo and data tracks within a group, said method comprising the steps of:

generating a first series of pulses corresponding to said detected servo signals in a radial sector, for application as clock pulses to a shift register;

generating a fixed second series of pulses from said detected synchronization signals, said pulses being generated to occur simultaneously with selected possible pulses generated in the immediately proceeding step, for application as input pulses to a shift register;

applying said first and said fixed second series of pulses to a shift register to generate a binary number characteristic of the radial location of said transducer means relative to said servo tracks in a group; decoding said binary number to identify the radial location of said transducer means;

comparing the identified radial location of said transducer means to the location of said selected data track and moving said transducer means radially toward the radial location of said selected data track and repeating the above steps unless said identified radial location of said transducer means is identical to the radial location of said selected data track.

11. A method as in claim 10 wherein each said servo track contains a plurality of adjacent data frames of recorded servo signals located on each servo track, each said data frame on a servo track located adjacent to and aligned with a corresponding data frame on adjacent servo tracks, each said servo track encoded by having recorded thereon magnetic servo signals at either a first or second location within said data frame, said corresponding first and second locations of said adjacent data frames on adjacent tracks being aligned and located along the same radii, said data frames being encoded with said recorded servo signals so that said tracks within a said group are uniquely encoded, each said data frame also having therein a recorded synchronization signal, and wherein said fixed second series of pulses generated contains a pulse corresponding to each adjacent data frame on a servo track, said pulse occurring at a time corresponding to either the first or second location for recorded servo signals within said data frame.

12. A method as in claim 11 wherein said transducer means is maintained in radial alignement with said selected data track by the further steps of:

comparing the detected servo signals corresponding to said recorded servo signals at said first and second locations produced by said transducer means during a time period corresponding to one selected data frame, said data frame being selected so that said servo tracks adjacent to said selected data track have recorded servo signals in said corresponding data frames at different locations within said corresponding data frames, said comparison indicating whether said transducer means is or is not radially aligned with said selected data track, and if not, the side of said selected data track on which said transducer means is located;

moving said transducer means radially toward the radial location of said selected data track in response to said comparison if said comparison indicates that said transducer means is not radially aligned with said selected data track.

13. A method as in claim 12 comprising the preliminary step of:

encoding said servo tracks within a group so that said corresponding data frames on successive servo tracks have recorded servo signals at said first or second locations within said corresponding data frames that are at the same location over a number of successively positioned servo tracks, said number of successively positioned servo tracks being equal to the number of adjacent data frames on a servo track.

14. A servo system as in claim 7 wherein each servo track has 4 data frames per radial sector.

15. A method for accurately maintaining a transducer means radially movable by electrical signals in radial alignment with a selected data track on a magnetic disc, said disc having a plurality of data tracks and servo tracks thereon, said servo tracks located in radial sectors on said disc and having radial locations interspersed with the radial locations of said data tracks, the radial spacing of adjacent servo and data tracks being equal, comprising:

uniquely encoding servo tracks in groups of successively positioned servo tracks by positioning in each said radial sector on said servo tracks, a plurality N of adjacent sets of data frames, each set of data frames having a data frame on each servo track aligned with corresponding data frames of the set on adjacent servo tracks, said data frames having recorded therein magnetic synchronization and servo signals in tribit format such that the encoding for the data frames for any two successively positioned servo tracks is different for only one of the corresponding pairs of data frames from the two successively positioned data tracks and such that the encoding of corresponding data frames in a set of successively radially positioned servo tracks is the same over N successively radially positioned servo tracks, whereby two N successively radially positioned servo tracks can be uniquely encoded in a group;

detecting with a transducer means the recorded servo signals for one selected set of data frames, said set of data frames selected being that for which the two servo tracks having radial locations adjacent to that of the selected data track have encoding which is different in the corresponding data frames of said set, whereby said recorded servo signals corresponding to the two possible encoding of data frames have equal amplitudes if said transducer is aligned with said selected data track, and unequal amplitudes if said transducer is not aligned with said selected data track; and comparing the amplitude of the detected recorded servo signals corresponding to the two possible encodings of data frames and generating from such comparison an electrical signal to move said transducer means into radial alignment with said selected data track when said comparison indicates that said transducer means is not so aligned.

* * * * *